(12) United States Patent
Dorr

(10) Patent No.: US 8,978,686 B2
(45) Date of Patent: Mar. 17, 2015

(54) SAFETY DEVICE AGAINST EXCESS TEMPERATURE

(75) Inventor: Walter Dorr, Völklingen (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,434

(22) PCT Filed: Feb. 26, 2011

(86) PCT No.: PCT/EP2011/000947
§ 371 (c)(1),
(2), (4) Date: Dec. 7, 2012

(87) PCT Pub. No.: WO2011/113524
PCT Pub. Date: Sep. 22, 2011

(65) Prior Publication Data
US 2013/0087214 A1   Apr. 11, 2013

(30) Foreign Application Priority Data
Mar. 18, 2010   (DE) .......................... 10 2010 011 879

(51) Int. Cl.
*F16K 17/38* (2006.01)
*F17C 13/06* (2006.01)
(Continued)

(52) U.S. Cl.
CPC .............. *F16K 17/383* (2013.01); *F17C 13/06* (2013.01); *F17C 13/12* (2013.01); *F17C 2201/0119* (2013.01); *F17C 2201/019* (2013.01); *F17C 2201/032* (2013.01); *F17C 2201/056* (2013.01); *F17C 2203/0617* (2013.01); *F17C 2205/0305* (2013.01); *F17C 2205/0314* (2013.01); *F17C 2205/0317* (2013.01); *F17C 2205/0332* (2013.01); *F17C 2205/0382* (2013.01); *F17C 2205/0394* (2013.01); *F17C 2205/05* (2013.01); *F17C 2221/014* (2013.01);
(Continued)

(58) Field of Classification Search
CPC .................................................... F16K 17/383
USPC .................... 137/72, 74; 220/89.4; 138/30
See application file for complete search history.

(56) References Cited

U.S. PATENT DOCUMENTS 1,744,977 A * 1/1930 Lovekin ......................... 137/72
2,194,541 A    3/1940 Buttner
(Continued)

FOREIGN PATENT DOCUMENTS

DE    27 55 369 A1    6/1979
DE    32 19 526 A1    12/1983
(Continued)

*Primary Examiner* — Kevin Lee
*Assistant Examiner* — P. Macade Nichols
(74) *Attorney, Agent, or Firm* — Roylance, Abrams, Berdo and Goodman LLP

(57) ABSTRACT

A safety device for containers pressurized with gas safeguards the gas side of the working chamber of hydraulic accumulators. A relief apparatus (2) reduces an elevated gas pressure in the container (3) caused by heat. The relief apparatus (2) is a component loaded under the influence of a shear force or compressive force. The shape change of the component under the influence of heat on the safety device (1) in a space (5) closed to the outside occurs such that a fluid-conducting connection (6) from the inside of the container (3) to the outside in the direction of the surroundings is enabled.

20 Claims, 2 Drawing Sheets

(51) Int. Cl.
  *F17C 13/12* (2006.01)
  *F16K 1/30* (2006.01)
(52) U.S. Cl.
  CPC .. *F17C 2223/0123* (2013.01); *F17C 2223/036* (2013.01); *F17C 2250/043* (2013.01); *F17C 2250/0439* (2013.01); *F17C 2250/072* (2013.01); *F17C 2260/023* (2013.01); *F17C 2260/042* (2013.01); *F17C 2270/0554* (2013.01); *F17C 2270/0563* (2013.01); *F16K 1/307* (2013.01)
  USPC .......................................................... 137/72

(56) References Cited

U.S. PATENT DOCUMENTS

| | | | |
|---|---|---|---|
| 3,180,374 A | | 4/1965 | Muller |
| 3,618,627 A * | 11/1971 | Wagner ............................ 137/73 |
| 4,232,796 A * | 11/1980 | Hudson et al. ................... 137/72 |
| 4,365,643 A * | 12/1982 | Masclet et al. ................... 137/70 |
| 5,311,899 A | 5/1994 | Isayama et al. |
| 6,286,536 B1 | 9/2001 | Kamp et al. |
| 6,367,499 B1 | 4/2002 | Taku |
| 6,592,047 B1 | 7/2003 | Staley |
| 7,323,966 B2 * | 1/2008 | Yoshikawa .................... 337/416 |

FOREIGN PATENT DOCUMENTS

| | | |
|---|---|---|
| DE | 195 40 692 A1 | 5/1996 |
| DE | 696 07 310 T2 | 11/2000 |
| DE | 20 2004 019 221 U1 | 4/2005 |
| EP | 1 367 316 A2 | 3/2003 |
| FR | 2 844 572 A1 | 3/2004 |
| GB | 925195 | 5/1963 |

* cited by examiner

SAFETY DEVICE AGAINST EXCESS TEMPERATURE

FIELD OF THE INVENTION

The invention relates to a safety device for gas-pressurized containers, in particular for safeguarding the gas side of the working space of hydropneumatic devices, for example, a hydraulic accumulator.

BACKGROUND OF THE INVENTION

To ensure the safe operation of devices with containers containing a pressurized gas, such as hydraulic accumulators, among other things, all risks which can arise at the installation site of these devices must also be considered. Possible hazardous external effects are important, especially temperature spikes that occur in a fire in the immediate vicinity of these gas-pressurized containers and that can lead to the failure of the container.

DE 32 19 526 A1 discloses a safety device for these pressure vessels, in particular for lightweight metal pressure vessels for liquefied gas. The safety device is formed essentially by a fusible screw threaded in a flange of the pressure vessel. The fusible screw contains a metal alloy with a low melting point, with the metal alloy being disposed in an exit channel for pressurized liquefied gas. The fusible alloy is covered by a metal foil ensuring tightness during alternating loads in operation of the pressure vessel.

In normal operation, the safety device is disposed in a region surrounded by fluid so that its temperature is defined. In the event of a fire, it can be assumed that the liquefied gas will undergo transition into the gaseous phase and the fusible alloy will thus be heated, as a result of which pressure equalization to the outside is enabled. An explosion of the pressure vessel is avoided in this way. However, the vicinity of the pressure vessel can be adversely affected or endangered by the rapidly emerging hot and liquid fusible alloy.

U.S. Pat. No. 6,367,499 B2 discloses a safety device for pressure vessels disposed in a relief opening of a gas pressure vessel. A piston-like closure element which is disposed axially in an outflow opening from the gas pressure vessel to the outside with an energy storage mechanism for opening of the outflow opening. The closure element is pressed against a stop of fusible material. The stop constitutes a heat-sensitive relief device. Under the action of heat, the molten material of the stop can escape radially from the safety device so that the closure element clears the outflow opening. A radial escape of the fusible material constitutes a safety increase in the known safety device.

SUMMARY OF THE INVENTION

An object of the invention is to provide an improved safety device for gas-pressurized containers which, when activated, does not constitute a hazard for the vicinity and which has a simple structure.

This object is basically achieved according to the invention by a safety device having a relief device which is formed from a heat-sensitive material and disposed in a closed space of the safety device. Through this space, exhibiting an opening, none of the material of the relief device can flow.

This design measure prevents a risk to the vicinity of the safety device due to the molten material of the relief device. Moreover, the relief device is pretensioned with shear, preferably for buckling or bulging, so that in principle melting of the relief device is not necessary to clear an outflow opening closed by the safety device. Softening is thus sufficient. The dimensioning of the space surrounding the relief device first enables a buckling or bulging of the relief device. The safety device according to the invention, however, also works when the relief device melts at elevated ambient temperature. In this case, due to the pretensioning and the associated shear forces, the relief device in turn clears the outflow opening closed in the normal operating state of the vessel. This melting away can be expected especially when the relief device is formed of a plastic material with a low melting point. If a ceramic material or a metal material, even in the form of a bimetal, is used for the relief device, buckling or bulging of the relief device can be expected to occur with subsequent clearance of the outflow opening as a result of the pretensioning.

The relief device is exposed to shear in the sense of pretensioning by a component which preferably directly closes a fluid-conducting connection (outflow opening). No additional energy storage mechanism pretensioning the relief device is necessary since the gas within the container alone pressurizes the relief device. The component closing the drain opening is held in position on the drain opening, secured with a seal, so that even in the unmounted state, not pressurized by gas, the safety device can be handled and in particular can be mounted without limitation. Under the action of heat, the relief device deforms, preferably along one axis of symmetry, and the component closing the outflow opening can be moved axially within the safety device and can clear the drain opening. The space, having several times the volume of the relief device, allows this reforming of the relief device in the sense of softening or melting.

The relief device is preferably formed from a plastic body which can deform or melt away under the action of heat, as described. Depending on the pressure to be maintained in the pertinent container, choosing a fluoroplastic, in particular a polyvinylidene plastic such as polyvinylidene fluoride, with a continuous working temperature range of from −30° C. to +140° C. or polyvinyl fluoride with a continuous working temperature range of from −70° C. to +110° C. can be feasible.

The relief device can be a rod-shaped plastic part stressed for buckling or bulging, or a cylindrical one, in the sense of a plastic part designed as a hollow cylinder.

In order to ensure reliable response of the relief device to heat, choosing the space around the relief device to be about four times as large as the volume occupied by the relief device itself is feasible.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
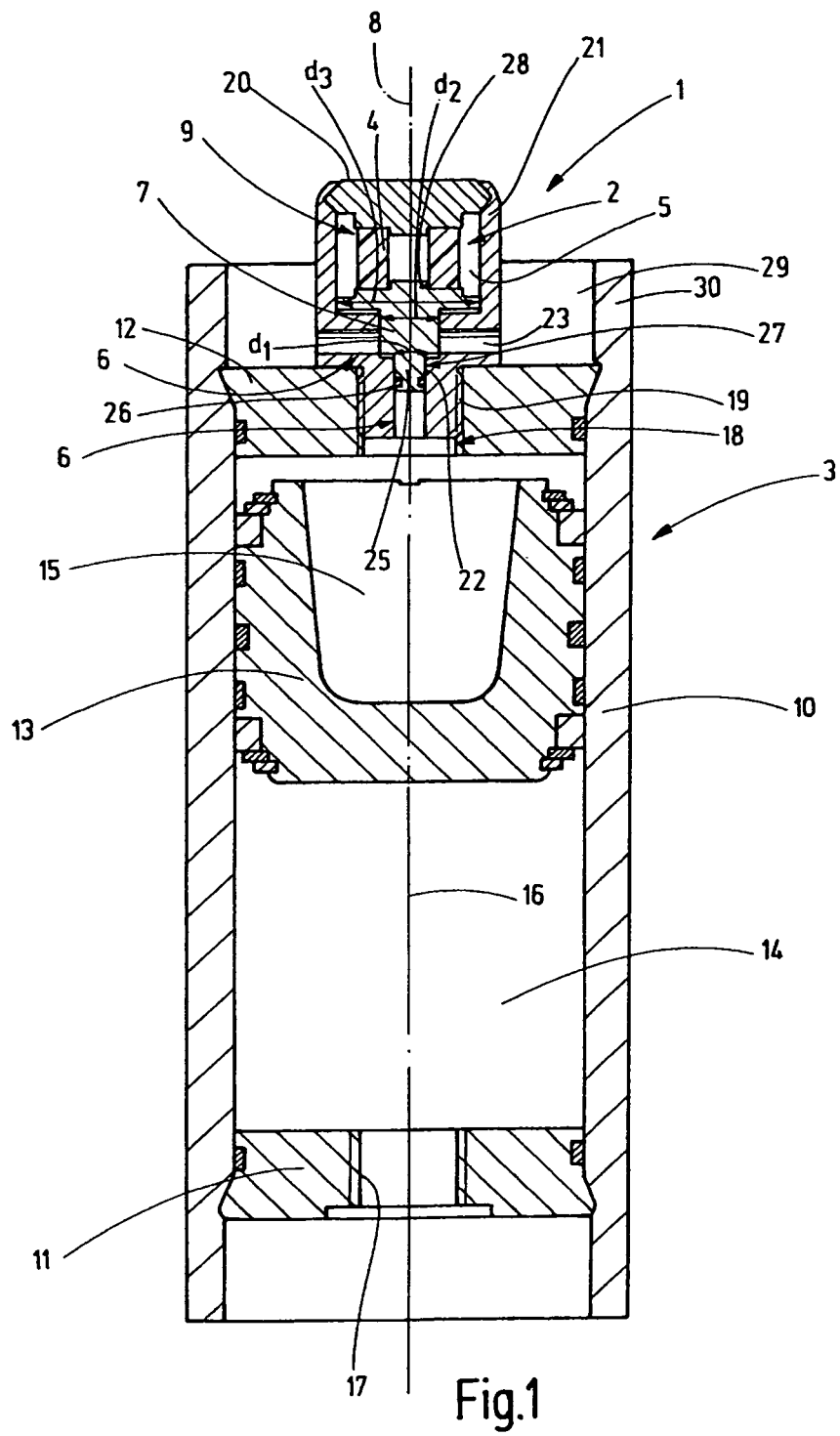
FIG. 1 is a schematically simplified side elevational view in section of a hydropneumatic piston accumulator provided with a safety device according to an exemplary embodiment of the invention.

FIG. 1 shows, in a schematic longitudinal section, not to scale, a container 3 constituting a hydraulic accumulator in the form of a piston accumulator in a conventional design. The hydraulic accumulator is provided with a hollow cylindrical accumulator housing 10 closed pressure tight on the end sides by a first cover 11 and a second cover 12. A cup-shaped piston 13 can move axially in the accumulator housing 10 and separates a fluid side, in particular oil side 14, from a gas side 15. The oil side 14 can be connected in the conventional manner to a hydraulic system (not shown) via an oil port 17 coaxial to the longitudinal axis 16 of the container 3. On its opposite side, in the cover 12, viewed coaxially to the longitudinal axis 16, a gas loading port 18 is provided to supply the gas side 15 in the conventional manner with a working gas, such as, for example, nitrogen, with a predetermined loading pressure.

Figure 2:
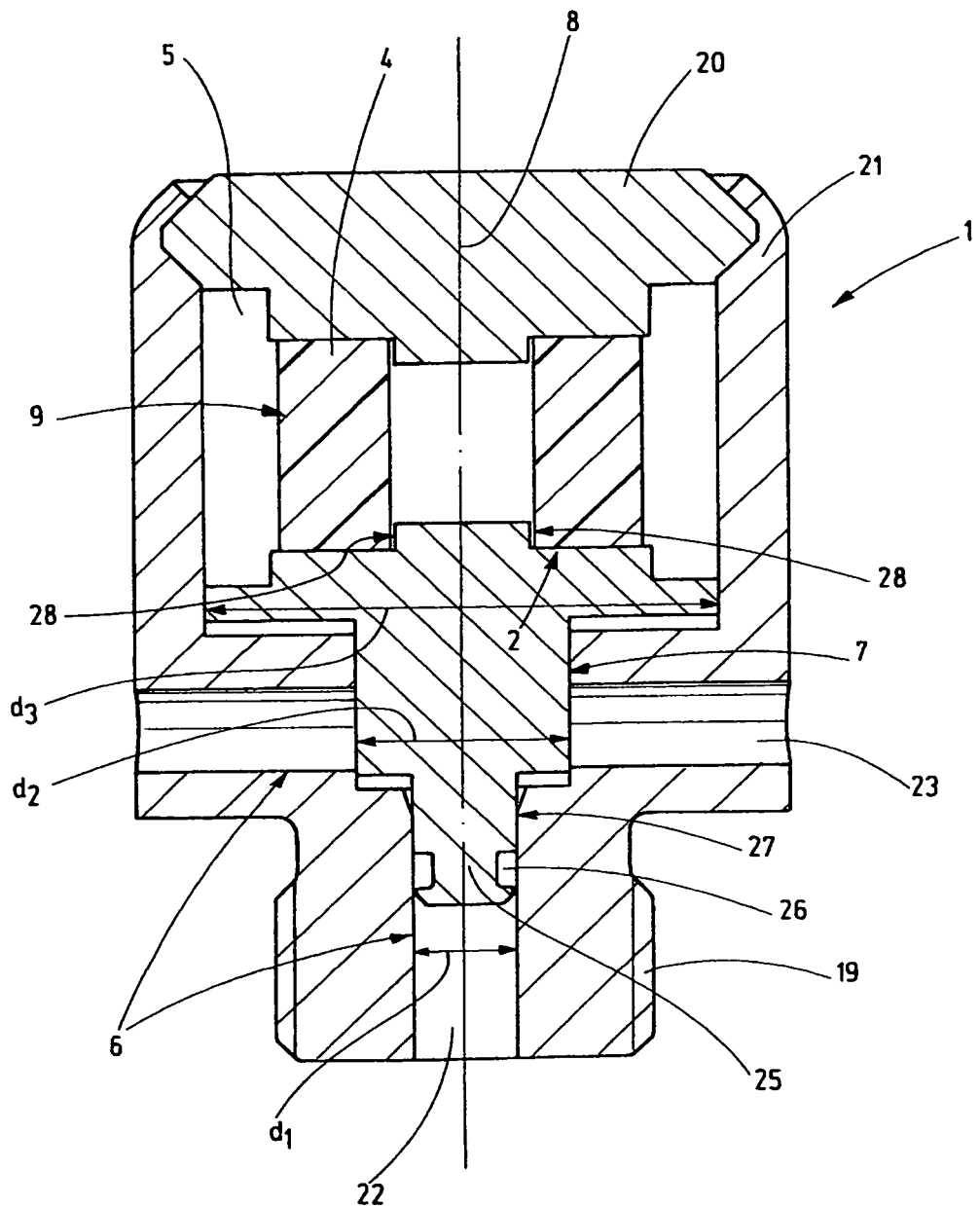
FIG. 2 is an enlarged, side elevational view in section of the safety device of FIG. 1.

In FIG. 1, the piston accumulator is provided with an exemplary embodiment of the safety device according to the invention as shown in FIG. 2. The safety device 1 is screwed directly into the gas loading port 18 of the cover 12, so that the safety device 1 directly borders the gas side 15 of the piston accumulator.

FIG. 2 shows in a schematic longitudinal section, not to scale, the safety device 1 for the container 3 which as a whole forms a kind of screw-in body for screwing or threading into the gas loading port 18. For this purpose, the safety device 1 has an external thread 19, which can be screwed into a corresponding internal thread of the cover 12 in the region of the gas loading port 18. The external thread 19 is disposed on a cup-shaped housing 21 of the safety device 1. The housing 21 is provided with a cover 20 crimped in the opposite direction to the external thread 19. The housing 21 on its outer periphery can have a hexagonal projection (not detailed) for screwing the housing 21 into the cover 12. A hexagonal recess (not shown) can be provided in the cover 20 of the housing 21 for being able to effect this screwing-in.

Viewed from the region of the housing 21 bearing the external thread 19 to roughly an axial center, the housing 21 is penetrated by a through bore 22 which widens in diameter upward and undergoes transition into a perpendicular cross channel 23 extending radially through the housing 21.

Both the cross channel 23 and the through bore 22 are closed by a plug-shaped or piston-shaped component or piston component 7 in the initial state of the safety device 1 shown in FIG. 2. The piston-shaped component 7, fits in the through bore 22 with an extension 25 of almost the same diameter as bore 22 and with a sealing element 26 (not shown) along its radial periphery 27, and is dimensioned like the diameter $d_1$ of the through bore 22. The extension 25 then widens to about twice the $d_1$ diameter in a portion of the piston component 7 closing the cross channel 23 in the illustrated initial state of the safety device 1. With this diameter $d_2$ of that portion, the piston component 7 projects into a space 5 of the housing 21 and then in turn widens in the shape of a plate to a diameter $d_3$ that is slightly smaller than the inside diameter of the cylindrically shaped space 5.

Viewed in the axial direction toward the cover 20, the diameter of the piston component 7 in turn diminishes incrementally so that the cross section is provided with two diameter offsets for the piston component 7 in the shape of steps.

A relief device 2 in the form of a thick-walled, cylindrical component 4, has an outside diameter greater than its axial length, is placed or clamped between the piston component 7 and the cover 20 and is held at its top and bottom in both directions by respective centering surfaces 28 on the cover 20 and the piston component 7.

The relief device 2 is loaded by shear resulting from the gas pressure of the gas side 15. The space 5 has a significantly larger inside diameter than the outside diameter of the relief device 2. In principle, when shear increases, the relief device 2 then can buckle or bulge. The relief device 2 is preferably formed as a plastic body 9 from a polyvinyl fluoride plastic having a temperature of continuous use of from −40° C. to +140° C. Particularly when a temperature of +140° C. is exceeded by the action of heat in the event of a fire in the vicinity of the safety device 1, the relief device 2 under the shear of the component 7 then deforms away from its axis 8 of symmetry and is deformed away, for example, by bulging or buckling into the space 5 or melts away altogether without further orientation. Since the relief device 2 is a hollow cylinder, such a bulging or buckling motion into the interior of the hollow cylinder is also in principle enabled. In addition to the initial bulging or buckling process, as a result of material softening at high temperature, at correspondingly even higher temperatures, the relief device 2 melts, and the plastic material, as shown, is displaced into the closed space 5. These processes take place comparably when the relief device 2 is formed of a metallic material, such as a bimetal.

In this case of failure, the piston component 7, which until then keeps closed the fluid-conducting connection 6 formed by the through bore 22 and the cross channel 23, moves under the overpressure arising under the action of heat on the container 30 on the gas side in the through bore 22 such that it moves partially into the space 5. As a result of this movement a controlled outflow of the gas, such as, for example, the working gas nitrogen, is enabled via the cross channel 23 to the outside so that an explosion or other damage of the container 3 cannot accidentally occur. Since the cross channel 23 is being continuously cleared, slow and controlled pressure relief occurs on the gas side.

Provided that, as shown in FIG. 1, the cross channel 23 with its two opposite cross channel segments discharges into a transition space 29 spaced on the edge side by a projection 30 of the wall of the accumulator housing 10, deflection of the gas overpressure jet upward takes place. A further reduction of the overpressure, which may be in the region of 1000 bar or more, can occur, so that individuals in the vicinity of the container definitely cannot be endangered. The collar solution shown in FIG. 1, in which the container 30 is encompassed, forming a protective collar or protective jacket, can also be omitted without the safety function of the device being adversely affected.

While one embodiment has been chosen to illustrate the invention, it will be understood by those skilled in the art that various changes and modifications can be made therein without departing from the scope of the invention as defined in the appended claims.

What is claimed is:

1. A safety device for gas-pressurized containers, comprising:
    a relief housing having an inlet connection connectable in fluid communication to an interior of a gas-pressurized container and an outlet connection connectable in fluid communication to an environment exterior of the container;
    an interior space in said relief housing closed to an exterior thereof;
    a valve member movably mounted in said relief housing between a closed position preventing fluid communication between said inlet connection and said outlet connection and an open position allowing fluid communication between said inlet connection and said outlet connection; and
    a relief component in said interior space coupled to and maintaining said valve member in the closed position when unheated and allowing said valve member to move to the open position when heated to soften said relief component only without melting said relief component by at least one of buckling or bulging of said relief component under action of at least one of sheer force or compression force while remaining entirely in said interior space, said relief component being unrestrained laterally inwardly and outwardly between axial end regions thereof.

2. A safety device according to claim 1 wherein
said relief component is deformable away from an axis of symmetry thereof under action of heat.

3. A safety device according to claim 1 wherein
said interior space has a volume at least several times a volume of said relief component.

4. A safety device according to claim 1 wherein
said relief component comprises a plastic body.

5. A safety device according to claim 4 wherein
said plastic body is formed of a fluoroplastic material.

6. A safety device according to claim 5 wherein
said fluoroplastic material is a polyvinylidene plastic.

7. A safety device according to claim 3 wherein
said relief component comprises a rod-shaped hollow body.

8. A safety device according to claim 2 wherein
said relief housing comprises a relief cover, said relief component being between said relief cover and said valve member, said valve member being pressurized through a through bore in said relief housing by gas in the container.

9. A safety device according to claim 8 wherein
said valve member comprises a piston engaged in said through bore in the closed position thereof;
said relief housing comprises a cross channel extending from said through bore to said outlet connection; and
a projection of a wall of a container housing encompasses said cross channel and said outlet connection.

10. A gas-pressurized container with a pressure relief, comprising:
a container housing with a container interior and with a container cover adjacent one end thereof, said cover having a loading port therein in fluid communication with said container interior;
a relief housing mounted in said loading port and having an inlet connection connected in fluid communication to said container interior and an outlet connection connected in fluid communication to an environment exterior of said container housing;
an interior space in said relief housing closed to an exterior thereof;
a valve member movably mounted in said relief housing between a closed position preventing fluid communication between said inlet connection and said outlet connection and an open position allowing fluid communication between said inlet connection and said outlet connection; and
a relief component in said interior space coupled to and maintaining said valve member in the closed position when unheated and allowing said valve member to move to the open position when heated to soften said relief component only without melting said relief component by at least one of buckling or bulging of said relief component under action of at least one of sheer force or compression force while remaining entirely in said interior space, said relief component being unrestrained laterally inwardly and outwardly between axial end regions thereof.

11. A gas-pressurized container according to claim 10 wherein
said relief component is deformable away from an axis of symmetry thereof under action of heat.

12. A gas-pressurized container according to claim 10 wherein
said interior space has a volume at least several times a volume of said relief component.

13. A gas-pressurized according to claim 10 wherein
said relief component comprises a plastic body.

14. A gas-pressurized container according to claim 13 wherein
said plastic body is formed of a fluoroplastic material.

15. A gas-pressurized container according to claim 14 wherein
said fluoroplastic material is a polyvinylidene plastic.

16. A gas-pressurized container according to claim 12 wherein
said relief component comprises a rod-shaped hollow body.

17. A gas-pressurized container according to claim 11 wherein
said relief housing comprises a relief cover, said relief component being between said relief cover and said valve member, said valve member being pressurized through a through bore in said relief housing by gas in said container housing through said loading port.

18. A gas-pressurized container according to claim 17 wherein
said valve member comprises a piston engaged in said through bore in the closed position thereof;
said relief housing comprises a cross channel extending from said through bore to said outlet connection; and
a projection of a wall of said container housing encompasses said cross channel and said outlet connection.

19. A gas-pressurized container according to claim 10 wherein
said container housing comprises a hydraulic accumulator.

20. A safety device for gas-pressurized containers, comprising:
a relief housing having an inlet connection connectable in fluid communication to an interior of a gas-pressurized container and an outlet connection connectable in fluid communication to an environment exterior of the container;
an interior space in said relief housing closed to an exterior thereof;
a valve member movably mounted in said relief housing between a closed position preventing fluid communication between said inlet connection and said outlet connection and an open position allowing fluid communication between said inlet connection and said outlet connection; and
a relief component including a rod-shaped hollow body in said interior space coupled to and maintaining said valve member in the closed position when unheated and allowing said valve member to move to the open position when heated by at least one of buckling or bulging of said relief component under action of at least one of sheer force or compression force while remaining entirely in said interior space, said interior space having a volume at least several times a volume of said relief component, said rod-shaped hollow body being retained at axial end regions thereof against lateral movement and being unrestrained laterally inwardly and outwardly between said axial end regions.

* * * * *